(12) United States Patent
Bui et al.

(10) Patent No.: US 10,242,279 B2
(45) Date of Patent: Mar. 26, 2019

(54) USER TERMINAL DEVICE AND METHOD FOR CONTROLLING THE SAME

(71) Applicant: Samsung Electronics Co., Ltd., Suwon-si, Gyeonggi-do (KR)

(72) Inventors: Cong-Nguyen Bui, Suwon-si (KR); Byung-jun Son, Seoul (KR); Hyun-guk Yoo, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 14/958,166

(22) Filed: Dec. 3, 2015

(65) Prior Publication Data

US 2016/0171333 A1    Jun. 16, 2016

(30) Foreign Application Priority Data

Dec. 11, 2014 (KR) ........................ 10-2014-0178684

(51) Int. Cl.
*G06F 3/0484* (2013.01)
*G06K 9/20* (2006.01)
*G06K 9/38* (2006.01)
*G06K 9/46* (2006.01)

(52) U.S. Cl.
CPC ....... *G06K 9/2081* (2013.01); *G06F 3/04845* (2013.01); *G06K 9/38* (2013.01); *G06K 9/4642* (2013.01); *G06K 2209/01* (2013.01)

(58) Field of Classification Search
CPC ...... G06K 9/2081; G06K 9/4642; G06K 9/38; G06K 2209/01; G06F 3/04845
See application file for complete search history.

(56) References Cited

U.S. PATENT DOCUMENTS

| 6,738,496 B1 | 5/2004 | Van Hall | |
|---|---|---|---|
| 2004/0076337 A1* | 4/2004 | Nishida | G06K 9/38 382/274 |
| 2011/0231796 A1 | 9/2011 | Vigil | |
| 2012/0087587 A1* | 4/2012 | Kacher | G06K 9/38 382/182 |
| 2012/0131520 A1* | 5/2012 | Tang | G06F 3/04842 715/863 |
| 2014/0168478 A1 | 6/2014 | Baheti et al. | |
| 2014/0297256 A1 | 10/2014 | Rogowski et al. | |
| 2015/0023599 A1* | 1/2015 | Geva | G06K 9/685 382/182 |

FOREIGN PATENT DOCUMENTS

| JP | 3906221 B2 | 4/2007 |
|---|---|---|
| KR | 10-0633443 B1 | 10/2006 |
| KR | 10-2008-0070244 A | 7/2008 |
| KR | 10-0908326 B1 | 7/2009 |
| WO | 2011/044231 A1 | 4/2011 |

* cited by examiner

*Primary Examiner* — Roberto W Flores
(74) *Attorney, Agent, or Firm* — Jefferson IP Law, LLP

(57) ABSTRACT

A user terminal device and a method for controlling the same are provided. The user terminal device includes a sensor configured to sense a user touch operation for a binarized text image, a controller configured to generate an indicator pointing out a point where the user touch operation is sensed, when the user touch operation is sensed by the sensor, and a display unit configured to display the binarized text image and the generated indicator.

15 Claims, 27 Drawing Sheets

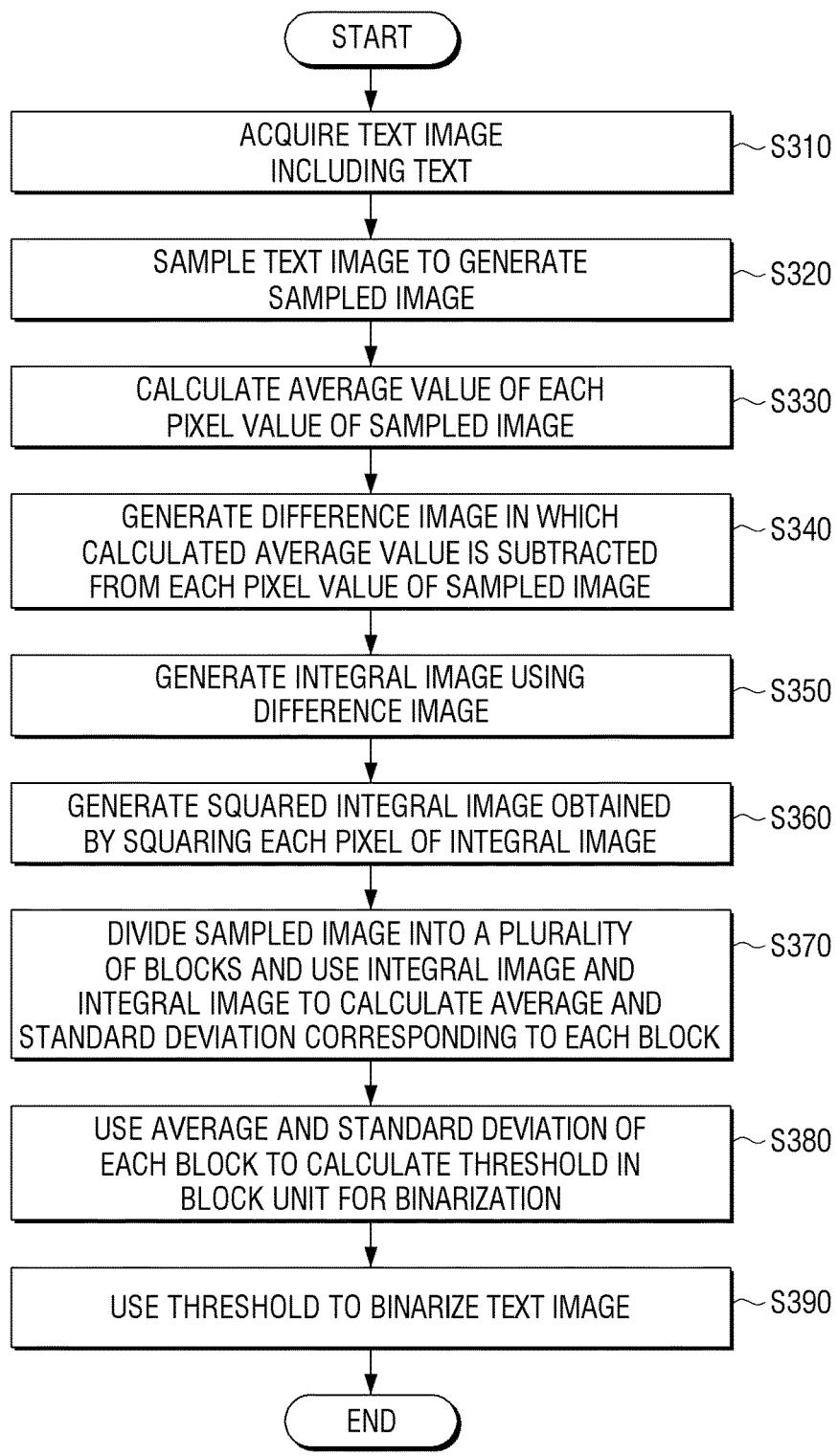

FIG. 4A

|   |   |   |   |   |
|---|---|---|---|---|
| 6 | 3 | 2 | 4 | 0 |
| 2 | 4 | 5 | 1 | 2 |
| 2 | 3 | 0 | 3 | 5 |
| 5 | 4 | 2 | 3 | 5 |
| 2 | 3 | 0 | 1 | 4 |

410

|    |    |    |    |    |
|----|----|----|----|----|
| 6  | 9  | 11 | 15 | 15 |
| 8  | 15 | 22 | 27 | 29 |
| 10 | 20 | 27 | 35 | 42 |
| 15 | 29 | 38 | 49 | 61 |
| 17 | 34 | 43 | 55 | 71 |

| 3 | 0 | -1 | 1 | -3 |
|---|---|----|---|----|
| 1 | 1 | 2  | 1 | -1 |
| 1 | 0 | -3 | 0 | 2  |
| 2 | 1 | -1 | 0 | 2  |
| -1| 0 | -3 | -2| 1  |

440

| 3 | 3 | 2 | 3 | 0 |
|---|---|---|---|---|
| 4 | 5 | 6 | 8 | 4 |
| 5 | 6 | 4 | 6 | 4 |
| 7 | 9 | 6 | 8 | 8 |
| 6 | 8 | 3 | 2 | 9 |

| □ COPY OF TRANSCRIPT DELIVERY CONTENT CONTENT) | 3. RELATIONSHIP BETWEEN FAMILY MEMBER AND HOUSEHOLDER<br>4. MOVE-IN DATE/RESET DATE, RESET REASON OF FAMILY MEMBER<br>5. NAMES OF OTHER FAMILY MEMBERS IN ADDITION TO DELIVERY SUBJECT<br>6. LAST SIX DIGITS OF RESIDENT REGISTRATION NUMBER OF OTHER FAMILY MEMBERS IN ADDITION TO DELIVERY SUBJECT<br>7. HOUSEMATE<br>8. FOREIGN SPOUSE/ FOREIGN PARENT |
|---|---|
| Auto zoom | |
| Flash<br>ABSTRACT<br>Freeze DELIVERY | 1. CHANGED CONTENTS OF PERSONAL INFORMATION<br>2. CHANGED MATTERS OF PAST ADDRESS   [ ] TOTAL<br>3. NAMES OF HOUSEHOLDER AMONG CHANGED MATTERS OF PAST ADDRESS |

FIG. 10C

| | |
|---|---|
| [] COPY OF TRANSCRIPT DELIVERY CONTENT CONTENT) [Auto zoom] | 3. RELATIONSHIP BETWEEN FAMILY MEMBER AND HOUSEHOLDER<br>4. MOVE-IN DATE/RESET DATE, RESET REASON OF FAMILY MEMBER<br>5. NAMES OF OTHER FAMILY MEMBERS IN ADDITION TO DELIVERY SUBJECT<br>6. LAST SIX DIGITS OF RESIDENT REGISTRATION NUMBER OF OTHER FAMILY MEMBERS IN ADDITION TO DELIVERY SUBJECT<br>7. HOUSEMATE<br>8. FOREIGN SPOUSE/ FOREIGN PARENT |
| [Flash]　　ABSTRACT<br>[Freeze] DELIVERY | 1. CHANGED CONTENTS OF PERSONAL INFORMATION<br>2. CHANGED MATTERS OF PAST ADDRESS　　　[ ] TOTAL<br>3. NAMES OF HOUSEHOLDER AMONG CHANGED MATTERS OF PAST ADDRESS |

1030

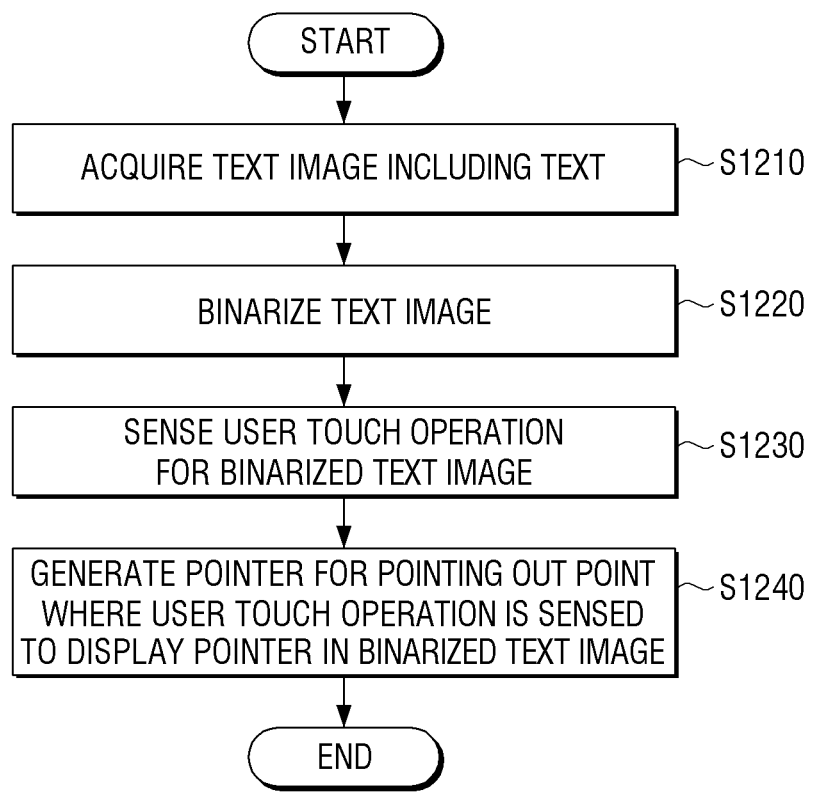

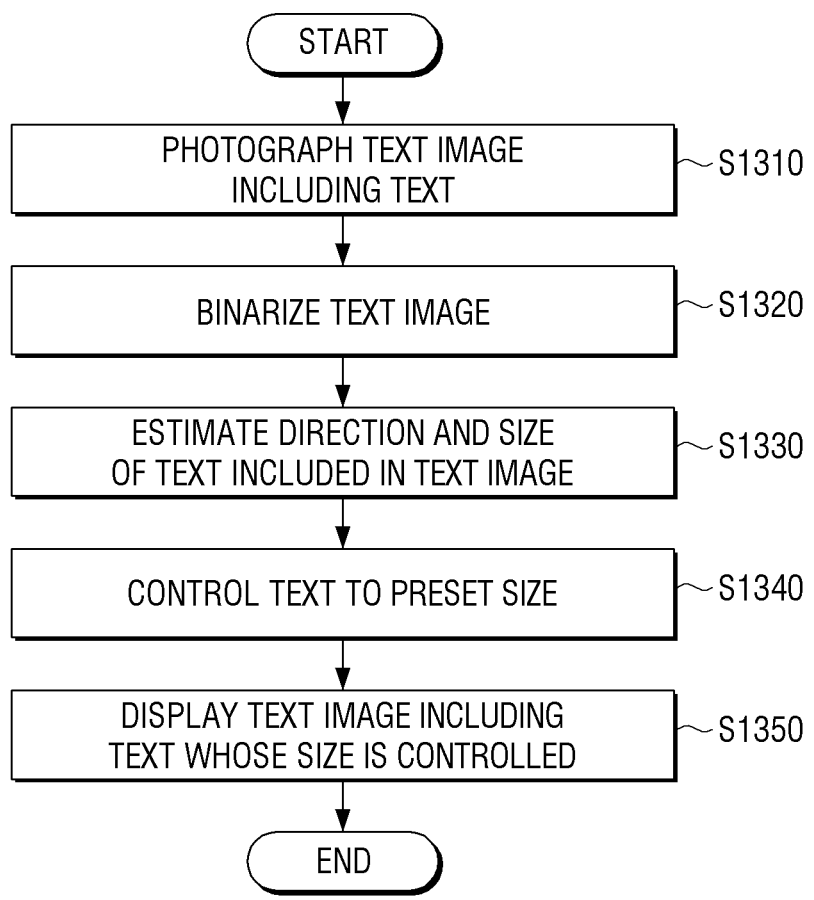

USER TERMINAL DEVICE AND METHOD FOR CONTROLLING THE SAME

CROSS-REFERENCE TO RELATED APPLICATION(S)

This application claims the benefit under 35 U.S.C. § 119(a) of a Korean patent application filed on Dec. 11, 2014 in the Korean Intellectual Property Office and assigned Serial No. 10-2014-0178684, the entire disclosure of which is hereby incorporated by reference.

TECHNICAL FIELD

The present disclosure relates to a user terminal device and a method for controlling the same. More particularly, the present disclosure relates to a user terminal device and a method for controlling a user terminal device capable of more accurately and clearly displaying a text by binarizing the text.

BACKGROUND

Based on advances in communications technology, various user terminal devices (for example, smart phone, tablet personal computer (PC), etc.) are able to manipulate text images. For example, a user terminal device, such as a smart phone, is able to display text. However, such a user terminal device may have a small display screen and thus display the text with a small size. As a result, when a person with poor vision or reads a text using the user terminal device having the small display screen, the text may not be seen well. To cope therewith, in the case of merely enlarging the text, the text may be broken or may be blurred.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a user terminal device and a method for allowing a user to more accurately and clearly read a text image.

In accordance with an aspect of the present disclosure, a user terminal device is provided. The user terminal device includes a sensor configured to sense a user touch operation for a binarized text image, a controller configured to generate an indicator pointing out a point where the user touch operation is sensed when the user touch operation is sensed by the sensor, and a display unit configured to display the binarized text image and the generated indicator.

The controller may control the display unit to control a size of a text included in the binarized text image to a preset size and display the controlled text.

The user terminal device may further include an image acquisition unit configured to acquire a text image including a text, wherein the controller may binarize the text image acquired by the image acquisition unit to generate the binarized text image.

The controller may sample the text image to generate the sampled image, calculate an average value of pixel values of the sampled image and generate a difference image in which the average value is subtracted from each pixel value of the sampled image, divide the sampled image into a plurality of blocks and use the difference image to calculate an average and a standard deviation of the plurality of blocks, use the average and the standard deviation of the plurality of blocks to calculate a threshold of the plurality of blocks, and use the threshold to binarize the sampled image.

The image acquisition unit may photograph a document including the text using a camera to acquire the text image.

The user terminal device may further include a storage unit, wherein the controller may store a plurality of binarized text image frames in the storage unit, determine a text image frame having the smallest blurring among the plurality of binarized text image frames when a preset command is input, and control the display unit to display the determined text image frame.

The controller may detect a user's hand area pointing out the text in the photographed text image, perform binarization on the remaining area other than the user's hand area, and synthesize the binarized remaining area with the user's hand area to generate a partially binarized text image.

The controller may control the display unit to display an indicator of a user's finger shape or a bar shape at a point where the user touch operation is sensed.

The controller may detect a text area having the text in the text image and perform binarization on the text area.

The controller may detect a picture area, a graph area, and a figure area other than the text area, generate the text image in which only the text area is binarized without performing the binarization on the picture area, the graph area, and the figure area while the text area is binarized, and control the display unit to control a size of an area in which the user touch operation is sensed and display the controlled area when the user touch operation is sensed in one of the picture area, the graph area, and the figure area.

In accordance with another aspect of the present disclosure, a method for controlling a user terminal device is provided. The method includes acquiring a text image including a text, binarizing the text image, sensing a user touch operation for the binarized text image, generating an indicator pointing out a point where the user touch operation is sensed, and displaying the indicator in the binarized text image.

In the displaying, a size of the text included in the binarized text image may be controlled to a preset size to display the text.

In the displaying, the size of the text included in the binarized text image may be determined, if it is determined that the determined size of text is smaller than the preset size, the text included in the binarized text image may be displayed while being enlarged to the preset size, and if the determined size of text is larger than the preset size, the text included in the binarized text image may be displayed while being reduced to the preset size.

The binarizing may include sampling the text image to generate the sampled image, calculating an average value of pixel values of the sampled image, generating a difference image in which the average value is subtracted from each pixel value of the sampled image, dividing the sampled image into a plurality of blocks, using the difference image to calculate an average and a standard deviation of the plurality of blocks, using the average and the standard deviation of the plurality of blocks to calculate a threshold of the plurality of blocks, and using the threshold to binarize the sampled image.

In the acquiring, the text image may be acquired by photographing a document including the text using a camera.

The displaying may include, when a preset command is input, determining a text image frame having the smallest blurring among a plurality of binarized text image frames stored during a preset period, and displaying the determined text image frame.

The binarizing may include detecting a user's hand area pointing out the text in the photographed text image, performing binarization on the remaining area other than the user's hand area, and synthesizing the binarized remaining area with the user's hand area to generate a partially binarized text image.

In the displaying, an indicator of a user's finger shape or a bar shape may be displayed at the point where the user touch operation is sensed.

In the binarizing, a text area having the text may be detected in the text image and binarization may be performed on the text area.

The method may further include detecting a picture area, a graph area, and a figure area other than the text area, generating the binarized text image only in the text area without performing binarization on the picture area, the graph area, and the figure area while the text area is binarized, controlling a size of an area in which the user touch operation is sensed, and displaying the controlled area when the user touch operation is sensed in one of the picture are, the graph area, and the figure area.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 3, 4A, and 4B are diagrams for describing a method for binarizing a text image according to various embodiments of the present disclosure;

FIGS. 5A, 5B, 6A, 6B, 6C, 7A, 7B, 8A, 8B, 9A, 9B, 10A, 10B, 10C, 11A, and 11B are diagrams illustrating an example of providing a clear text image according to various embodiments of the present disclosure; and FIGS. 12, 13, 14, 15, 16, and 17 are flowcharts for describing a method for controlling a user terminal device according to various embodiments of the present disclosure.

Throughout the drawings, like reference numerals will be understood to refer to like parts, components, and structures.

DETAILED DESCRIPTION

Figure 1:
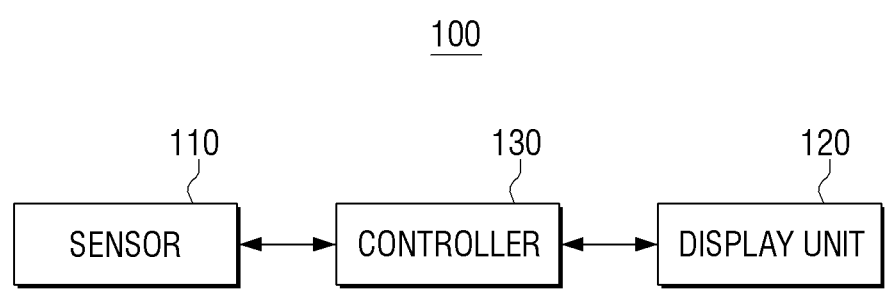
FIG. 1 is a block diagram schematically illustrating a configuration of a user terminal device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, the descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms "first", "second", and the like, may be used to describe various components, but the components are not to be construed as being limited by the terms. The terms are used to distinguish one component from another component.

It will be further understood that the terms "comprises" or "have", as used in the present disclosure, specify the presence of features, numerals, steps, operations, components, or parts mentioned in the present disclosure, or a combination thereof, but do not preclude the presence or addition of one or more other features, numerals, steps, operations, components, parts, or a combination thereof.

In the various embodiments of the present disclosure, a "module" or a "unit" performs at least one function or operation and may be implemented by hardware or software or a combination of the hardware and the software. Further, a plurality of "modules" or a plurality of "units" are integrated into at least one module except for the "module" or "unit" which needs to be implemented by specific hardware and thus may be implemented by at least one processor (not illustrated).

According to an embodiment of the present disclosure, a user terminal device is assumed to be collectively called a mobile or fixed type user terminal device such as user equipment (UE), a mobile station (MS), an advanced MS (AMS), and a device.

Hereinafter, an embodiment of the present disclosure will be described with reference to the accompanying drawings. In describing an embodiment of the present disclosure with reference to the accompanying drawings, components that are the same as or correspond to each other will be denoted by the same reference numerals, and an overlapped description thereof will be omitted.

FIG. 1 is a block diagram schematically illustrating a configuration of a user terminal device according to an embodiment of the present disclosure.

Referring to FIG. 1, a user terminal device 100 includes a sensor 110, a display unit 120, and a controller 130. In this case, the user terminal device 100 may be a smart phone, which is only an example. Therefore, the user terminal device 100 may be implemented as any of various user terminal devices such as a tablet personal computer (PC), a notebook PC, a desk top PC, a smart television (TV), and a kiosk.

The sensor 110 senses a user touch operation for controlling the user terminal device 100. For example, to generate an indicator for an area which a user wants to see, the sensor 110 may sense the user touch operation for a binarized text image.

The display unit 120 displays image data depending on a control of the controller 130. For example, the display unit 120 may display the binarized text image. When the user touch operation for the binarized text image is sensed, the display unit 120 may display the indicator at the point where the user touch operation is sensed, depending on the control of the controller 130.

The controller 130 controls a general operation of the user terminal device 100. For example, when the user touch operation for the binarized text image is sensed, the controller 130 may generate the indicator at the point where the user touch operation is sensed and control the display unit 120 to display the indicator along with the binarized text image.

In more detail, the controller 130 may acquire the text image including the text. In this case, the controller 130 may receive the text image from an external source and may photograph the text image using a camera.

The controller 130 may binarize the acquired text image. For example, the controller 130 may use a difference image of the text image to binarize the text image, thereby generating the binarized text image. In more detail, the controller 130 may sample the text image to generate the sampled image. The controller 130 may calculate an average value of pixel values of the sampled image and generate a difference image in which the average value is subtracted from each pixel value of the sampled image. The controller 130 may divide the sampled image into a plurality of blocks and may use the difference images to calculate an average and a standard deviation of the plurality of blocks. In this case, the controller 130 may integrate each pixel value for the difference images to generate integral images and generate squared integral images in which each pixel of the integral images is integrated and may use the integral image and the squared integral image to calculate the average and the standard deviation of the plurality of blocks. The controller 130 may use the average and the standard deviation of the plurality of blocks to calculate a threshold of the plurality of blocks and may use the threshold to binarize the sampled image.

As described above, the more rapid and efficient binarization may be implemented by binarizing the text image using the difference image of the text image. The binarization method according to various embodiments of the present disclosure will be described below in more detail with reference to FIGS. 3 to 4B.

Further, when the sensor 110 senses the user touch operation for the binarized text image, the controller 130 may generate the indicator at the point where the user touch operation is sensed and control the display unit 120 to display the indicator in the binarized text image. In this case, the controller 130 may control the display unit 120 to display the indicator of a human hand shape.

The controller 130 may control the display unit 120 to control a size of the text included in the binarized text image to a preset size and display the controlled text. In more detail, the controller 130 may determine the size of the text included in the binarized text image. Further, when the determined size of text is smaller than the preset size, the controller 130 may control the display unit 120 to enlarge the text included in the binarized text image to the preset size and display the enlarged text. Further, when the determined size of text is larger than the preset size, the controller 130 may control the display unit 120 to reduce the text included in the binarized text image to the preset size and display the reduced text.

That is, the user watches the size of the text included in the binarized text image at the preset size, thereby watching the preset size of text. For example, when the preset size of text is a size which a person with poor vision may most suitably recognize, the person with poor vision may receive the clearest and best-looking text even though they acquire any size of text.

According to various embodiments of the present disclosure, an image acquisition unit may photograph a document including a text using a camera to acquire the text image. When photographing the text image using the camera, the controller 130 may binarize the plurality of photographed text image frames and store the plurality of binarized text image frames.

Further, when a preset command (for example, command to select a specific button) is input, the controller 130 may determine a text image frame having the smallest blurring among the plurality of binarized text image frames and may control the display unit 110 to display the determined text image frame.

As described above, the blurring degree is determined to provide the text image frame having the smallest blurring to the user, such that the user may receive the clearer text image.

The controller 130 detects an area in which a user's finger pointing out the text in the photographed text image is displayed, performs binarization on the remaining area other than the area in which the user's finger is displayed, and synthesizes the binarized remaining area with the area in which the finger is displayed to generate the partially binarized text image. In this case, the controller 130 may change the area in which the finger is displayed to other colors or change the finger to other objects.

As described above, faster binarization may be implemented by performing the binarization on the text area, not the area in which the finger is displayed. The area in which the finger is displayed is displayed to be differentiated from other areas by image processing, thereby more accurately confirming the area which is pointed out by the user's finger.

The controller 130 may detect the text area having the text in the text image and perform the binarization only on the text area. The controller 130 may detect a picture area, a graph area, and a figure area in addition to the text area and generate the binarized text image only for the text area without performing the binarization on the picture area, the graph area, and the figure area while the text area is binarized. Further, when one of the picture area, the graph area, and the figure area is touched, the controller 130 may control the display unit 120 to control the size of the touched area and display the controlled touched area.

As described above, the faster binarization processing may be implemented by performing the binarization only on the text image and the area touched by the user may be displayed while being enlarged or reduced to more quickly recognize the area touched by the user.

Hereinafter, the present disclosure will be described in more detail with reference to FIGS. 2 to 11B.

Figure 2:
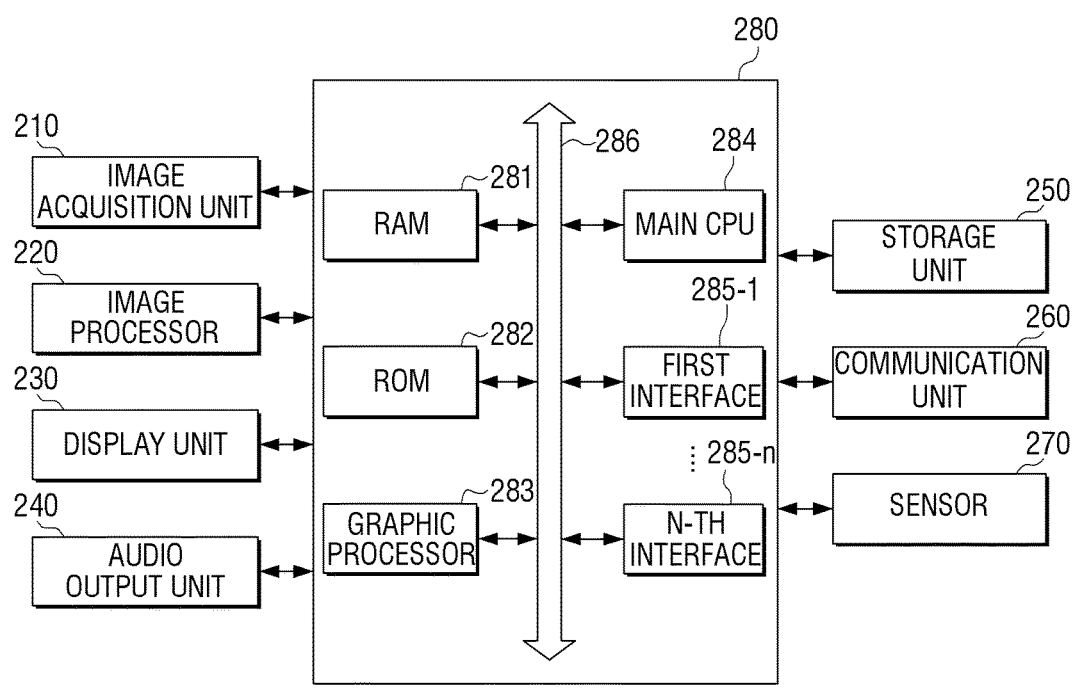
FIG. 2 is a block diagram illustrating a configuration of a user terminal device according to an embodiment of the present disclosure.

FIG. 2 is a block diagram illustrating a configuration of a user terminal device according to an embodiment of the present disclosure.

Referring to FIG. 2, the user terminal device 200 includes an image acquisition unit 210, an image processor 220, a display unit 230, an audio output unit 240, a storage unit 250, a communication unit 260, a sensor 270, and a controller 280.

The image acquisition unit 210 acquires a text image including a text by various methods. In more detail, the image acquisition unit 210 includes a camera which photographs the text to acquire the text image. The image acquisition unit 210 may receive the text image from an external source (for example, server, etc.) to acquire the text image.

The image processor 220 performs an image processing operation on the image data received from an external source. In more detail, the image processor 220 may perform various image processes, such as decoding, scaling, noise filtering, frame rate conversion, and resolution conversion, on the image data.

The display unit 230 displays images and user interfaces (UIs) which are input from various sources. For example, the display unit 240 may display the text image acquired by the image acquisition unit 210. In this case, the display unit 240 may display the text included in the binarized text image while enlarging the text, depending on the control of the controller 280. The display unit 240 may display the indicator at the point where the user touch operation is sensed.

The audio output unit 240 is configured to output various kinds of alarm sounds or voice messages in addition to various audio data on which various processing operations such as decoding, amplification, and noise filtering are performed by the audio processor (not illustrated).

The storage unit 250 stores various modules for driving the user terminal device 200. For example, the storage unit 250 may store software including a base module, a sensing module, a communication module, a presentation module, a web browser module, and a service module. In this case, the base module is a basic module which processes signals transferred from each hardware included in the user terminal device 200 and transfers the processed signals to an upper layer module. The sensing module is a module which collects information from various kinds of sensors and analyzes and manages the collected information and may also include a face recognition module, a voice recognition module, a motion recognition module, a near field communication (NFC) recognition module, etc. The presentation module is a module for configuring a display screen and may include a multimedia module which plays and outputs multimedia contents and an UI rendering module which performs UI and graphic processing. The communication module is a module for communicating with an external source. The web browser module means a module which performs web browsing to access a web server. The service module is a module which includes various kinds of applications for providing various services. For example, the storage unit 250 may store binarization program for binarizing the text image.

As described above, the storage unit 250 may include various program modules some of which may be omitted, changed, or added according to a kind and characteristics of the user terminal device 200. For example, when the user terminal device 200 described above is implemented as a tablet PC, the base module may further include a position determination module for determining a global positioning system (GPS) based position and the sensing module may further include the sensing module for sensing an operation of a user.

The communication unit 260 is configured to communicate with various types of external devices according to various types of communication schemes. The communication unit 260 may include various communication chips such as a Wi-Fi chip, a Bluetooth chip, an NFC chip, and a wireless communication chip. In this case, the Wi-Fi chip, the Bluetooth chip, and the NFC chip each perform communication by a Wi-Fi scheme, a Bluetooth scheme, and an NFC scheme. Among those, the NFC chip means a chip which is operated by the NFC scheme using a band of 13.56 MHz among various radio frequency identification (RF-ID) frequency bands such as 135 kHz, 13.56 MHz, 433 MHz, 860 to 960 MHz, and 2.45 GHz. The Wi-Fi chip or the Bluetooth chip first transmits and receives various connection information such as a service set identifier (SSID) and a session key, performs a communication connection using the various connection information, and transmits and receives various information. The wireless communication chip may include a chip which performs communication according to various communication standards such as Institute of Electrical and Electronics Engineers (IEEE), ZigBee, 3rd generation (3G), 3G partnership project (3GPP), and long term evolution (LTE). For example, the communication unit 260 may receive text image data from an external source.

The sensor 270 senses the user touch operation for controlling the user terminal device 200. For example, the sensor 270 may be implemented as a touch panel to sense the user touch operation which is input to the display unit 230.

The controller 280 controls a general operation of the user terminal device 200 by using various programs stored in the storage unit 250.

As illustrated in FIG. 2, the controller 280 may include a random access memory (RAM) 281, a read only memory (ROM) 282, a graphic processor 283, a main CPU 284, first to n-th interfaces 285-1 to 285-n, and a bus 286. In this case, the RAM 281, the ROM 282, the graphic processor 283, the main central processing unit (CPU) 284, the first to n-th interfaces 285-1 to 285-n, and the like may be connected to each other via the bus 286.

The ROM 282 stores a set of commands for system booting. When a turn on command is input and thus power is supplied, the main CPU 284 copies an operating system (O/S) stored in the storage unit 250 to the RAM 281 according to the command stored in the ROM 282 and executes the O/S to boot the system. When the booting is completed, the main CPU 284 copies various application programs stored in the storage unit 250 to the RAM 281 and executes the application programs copied to the RAM 281 to perform various operations.

The graphic processor 283 uses an operator (not illustrated) and a renderer (not illustrated) to create a screen including various objects such as an indicator, an icon, an image, and a text. The operator operates attribute values, such as coordinate values, forms, sizes, and colors which will be displayed by each object according to a layout of the screen, based on the control command received from the input unit. The renderer generates a screen of various layouts including objects based on the attribute values which are operated by the operator. The screen generated by the renderer is displayed in a display area of the display unit 230.

The main CPU 284 accesses the storage unit 250 to perform booting using the O/S stored in the storage unit 250. The main CPU 284 performs various operations using various programs, contents, data, and the like which are stored in the storage unit 250.

The first to n-th interfaces 285-1 to 285-n are connected to the foregoing various components. One of the interfaces may be a network interface which is connected to the external devices through a network.

For example, the controller 280 acquires the text image including the text through the image acquisition unit 210. In this case, the controller 280 may photograph the text document using the camera of the image acquisition unit 210 to acquire the text image. The controller 280 may receive the text document through the image acquisition unit 210 from an external source.

The controller 280 performs the binarization on the received text document. For example, the controller 280 may perform binarization using the difference image, to thereby increase the operation speed of the binarization operation and reduce the computation. The binarization operation for the text document will be described in more detail with reference to FIGS. 3 to 4B.

FIGS. 3, 4A and 4B are diagrams for describing a method for binarizing a text image according to various embodiments of the present disclosure.

Referring to FIG. 3, the controller 280 may acquire the text image including the text at operation S310. In this case, the controller 280 may divide the text image into a plurality of zones when the text image is equal to or more than a preset size (for example, 4 MB).

The controller 280 may sample the text image to generate the sampled image at operation S320. For example, the controller 280 may sample the text image at a ratio of $\frac{1}{2}^n$ (for example, $\frac{1}{4}$, $\frac{1}{16}$, $\frac{1}{64}$, etc.) to make the computation speed faster.

The controller 280 may calculate an average value pAverage of each pixel value of the sampled image at operation S330.

The controller 280 may generate the difference image in which the calculated average value pAverage is subtracted from each pixel value of the sampled image at operation S340. In this case, the pixel values of the difference image may have 0 or a value approximating 0 or have a value much smaller than the pixel value of the sampled image.

As illustrated in FIG. 4A, when the pixel value of the sampled image 410 is given, the controller 280 may generate the difference image 430 in which the average value of the pixel values of the sampled image is subtracted from each pixel value of the sampled image illustrated at the left of FIG. 4B.

The controller 280 may use the difference image to generate an integral image at operation S350 and generate a squared integral image in which each pixel of the integral image is squared at operation S360.

The controller 280 may divide the sampled image into a plurality of blocks and use the integral image and the squared integral image to calculate averages and standard deviations corresponding to each block at operation S370. In this case, the average and the standard deviation are used to determine a sampling method for the next frame. For example, when the standard deviation of the sampled image is higher than the preset value, the controller 280 may lower the sampling ratio and when the standard deviation of the sampled image is smaller than the preset value, the controller 280 may increase the sampling ratio.

The controller 280 may use the averages and the standard deviations of each block to calculate the threshold in a block unit for binarization at operation S380. In this case, the controller 280 may use Sauvola Formula to calculate the threshold in the block unit. The controller 280 may calculate the threshold by performing linear interpolation on the remaining pixels other than the sampling.

The controller 280 may use the threshold to binarize the text image at operation S390. In more detail, the controller 280 may represent the corresponding pixel by a first color (for example, black) when a pixel value of the corresponding pixel is larger than the threshold and may represent the corresponding pixel by a second color (for example, white) when a pixel value of the corresponding pixel is smaller than the threshold.

As described above, the computation may be reduced and the computation speed may be remarkably increased, by performing the binarization operation using the difference image of the sampled image. In more detail, in the case of generating the integral image using the sampled image, an integral image 420 as illustrated at the right of FIG. 4A is calculated when the sampled image 410 is given as illustrated at the left of FIG. 4A. That is, a pixel value of the integral image 420 is increased. However, in the case of using the difference image 430 of the sampled image 410 as illustrated at the left of FIG. 4B, an integral image 440 as illustrated at the right of FIG. 4B may be calculated. In this case, the integral image 440 calculated using the difference image 430 has a pixel value much smaller than that of the integral image 420 calculated using the sampled image 410, and therefore the computation is reduced and the computation speed is quick.

When the binarization for the text image is performed and the user touch operation is sensed by the sensor 270, the controller 280 may generate the indicator pointing out the point where the user touch operation is sensed.

FIGS. 5A to 11B are diagrams illustrating an example of providing a clear text image according to various embodiments of the present disclosure.

Figure 5A:
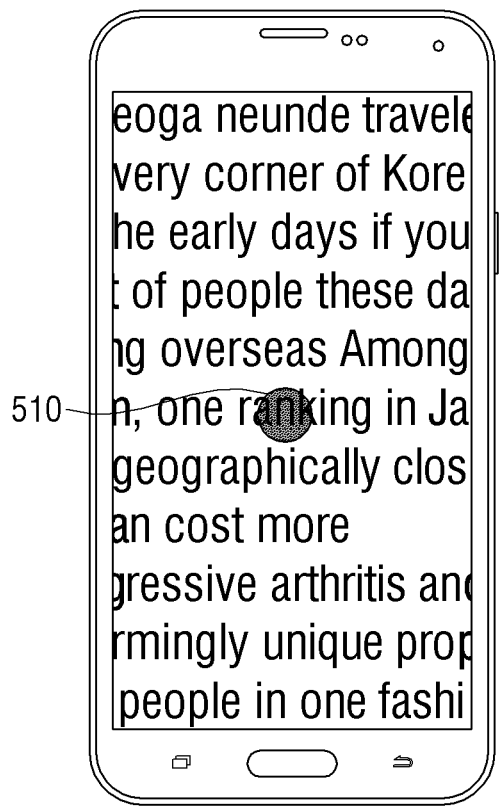
Figure 5B:
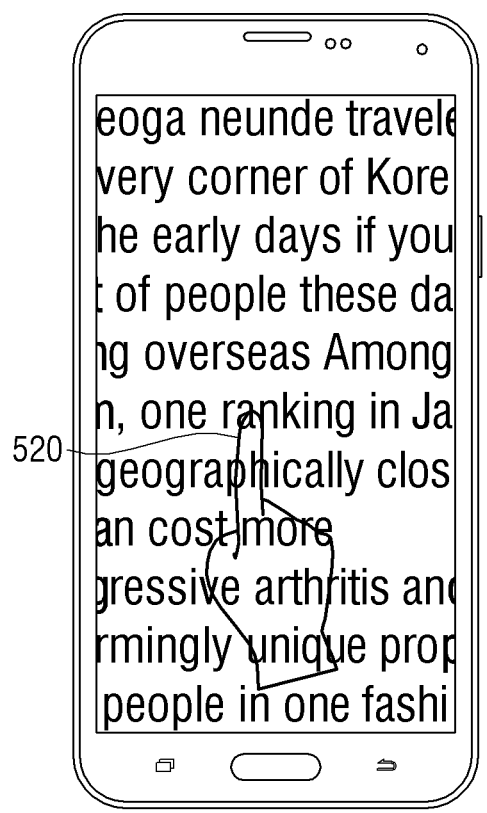

Referring to FIG. 5A, when a user touch operation for a first point 510 of the text image is sensed, the controller 280 may calculate coordinate values for the point where the user touch operation is sensed, generate the indicator 520 of a human hand shape at the calculated coordinate values, and control the display unit 230 to display the generated indicator 520.

Meanwhile, the indicator generated by the user touch operation which allows the user to point out a specific text may be a human hand shape, which is only example. Therefore, the indicator may be implemented as an object having other colors or an object having a human shape.

Figure 6A:
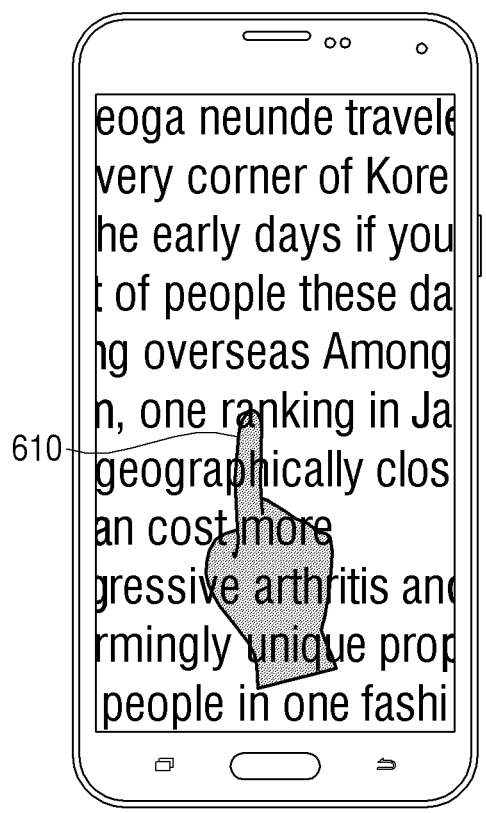
Figure 6B:
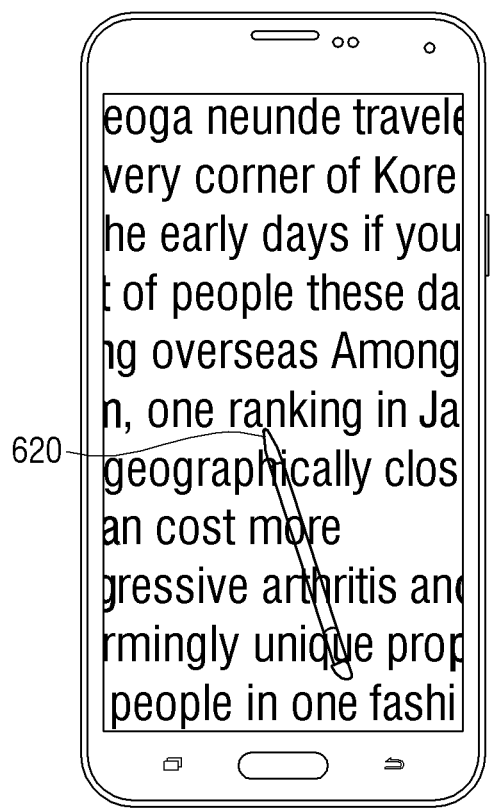
Figure 6C:
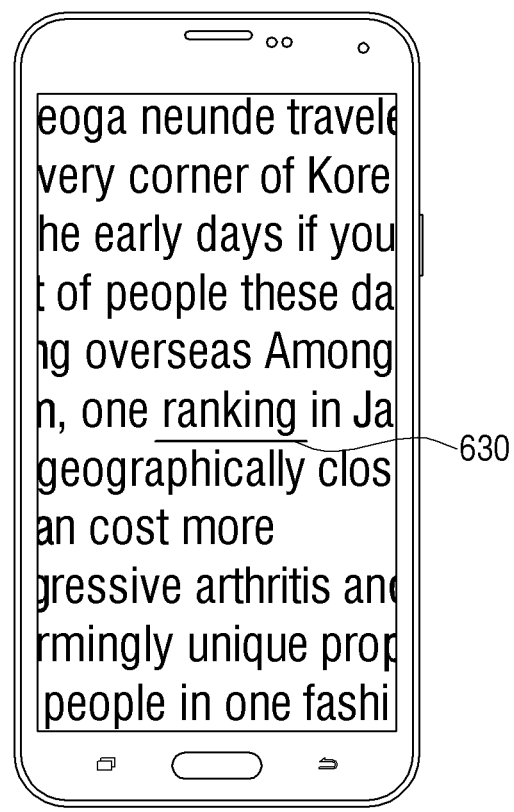

Referring to FIG. 6A, the indicator may be implemented as a human hand shape 610 of a specific color (for example, yellow, etc.), as illustrated in FIG. 6B, the indicator may be implemented as a pen form 620, and as illustrated in FIG. 6C, the indicator may be implemented as an underline form 630.

The controller 280 may control the size of the text included in the binarized text image to be the preset size and control the display unit 230 to display the text image including the text having the controlled size.

In more detail, the controller 280 may determine the size of the text included in the binarized text image. Further, when the determined size of text is smaller than the preset size, the controller 280 may control the display unit 230 to enlarge the text included in the binarized text image to the preset size and display the enlarged text.

Figure 7A:
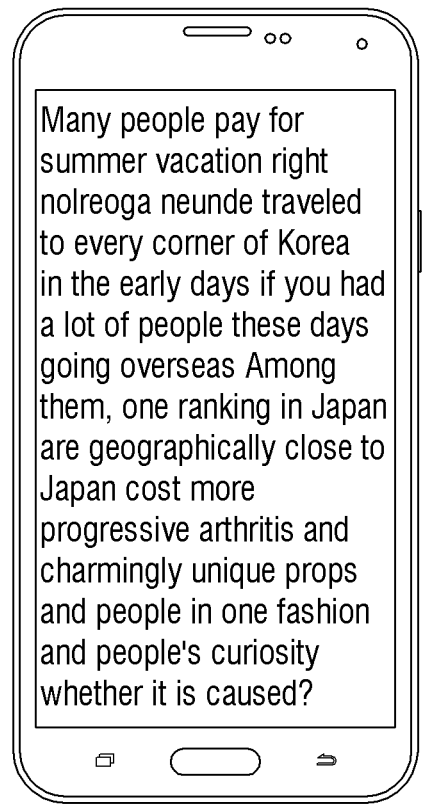
Figure 7B:
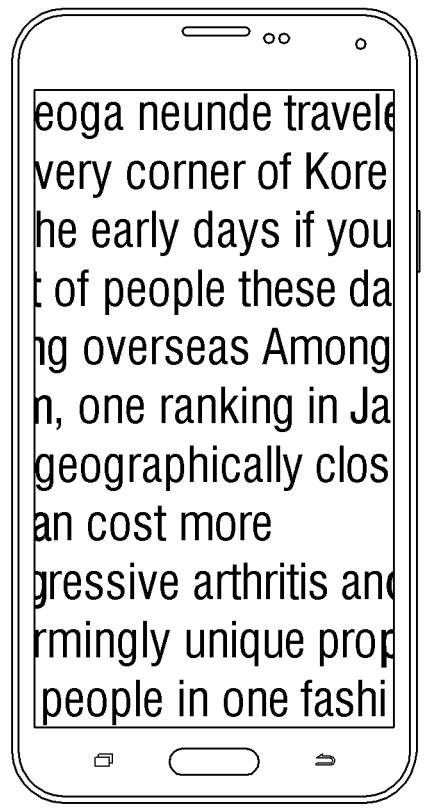

Referring to FIG. 7A, when a text of a first size (for example, 7) is acquired, the controller 280 may determine the size of the text and determine whether the determined size of text is larger than a preset size (for example, 10). Since the size of the text included in the acquired text image is smaller than the preset size, as illustrated in FIG. 7B, the controller 280 may control the display unit 230 to enlarge the size of the text included in the acquired text image to the preset size and display the enlarged text.

However, when the determined size of text is larger than the preset size, the controller 280 may control the display unit 230 to reduce the text included in the binarized text image to the preset size and display the reduced text.

Figure 8A:
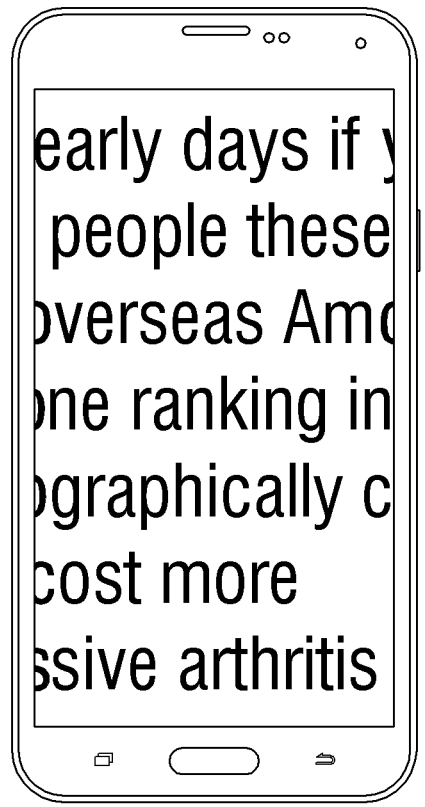
Figure 8B:
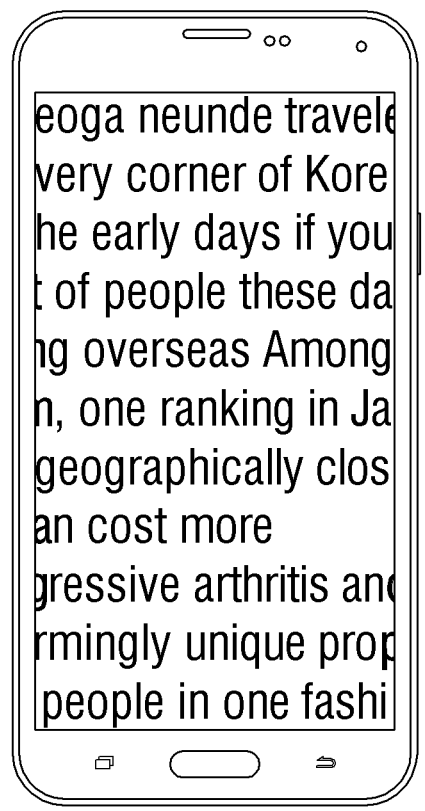

Referring to FIG. 8A, when a text of a second size (for example, 13) is acquired, the controller 280 may determine the size of the text and determine whether the determined size of text is larger than a preset size (for example, 10). Since the size of the text included in the acquired text image is larger than the preset size, as illustrated in FIG. 8B, the controller 280 may control the display unit 230 to enlarge the size of the text included in the acquired text image to the preset size and display the enlarged text.

The controller 280 may control the display unit 230 to control only the size of the text positioned at the point where the user touch operation is sensed to the preset size and display the controlled text.

Figure 9A:
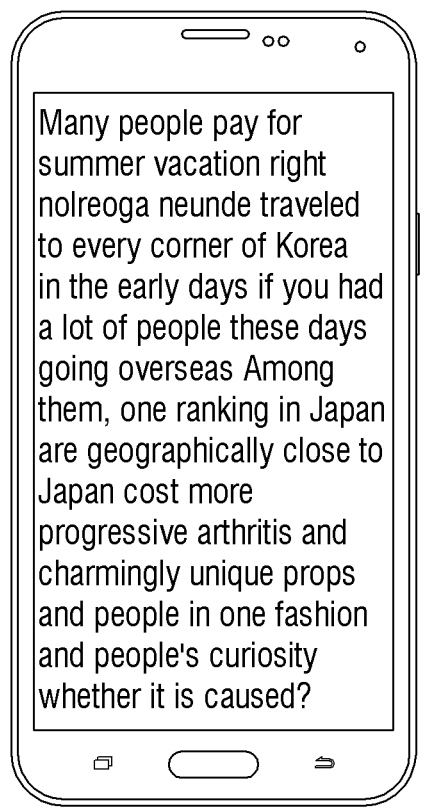
Figure 9B:
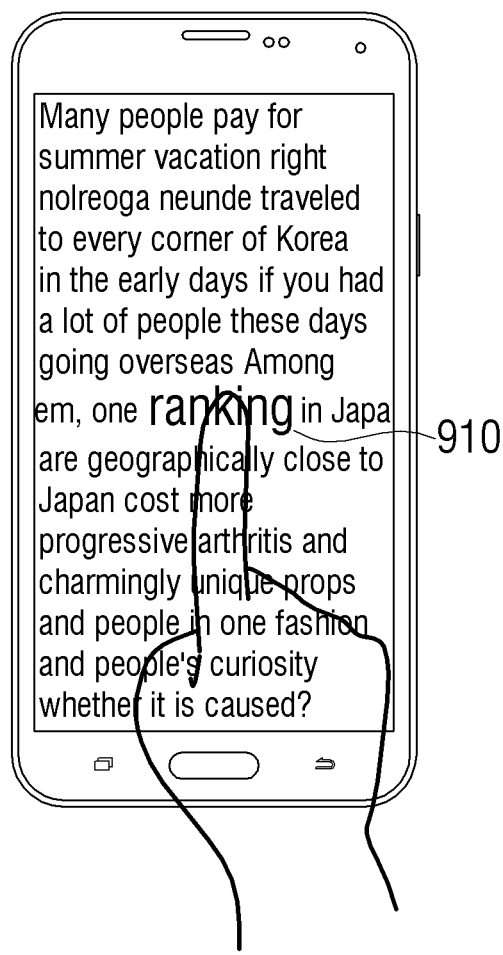

Referring to FIG. 9A, when the user senses the user touch operation by which the user touches the first point while the binarized text image is displayed, as illustrated in FIG. 9B, the controller 280 may control the display unit 230 to enlarge a text 910 positioned at the same column as the text positioned at the point where the user touch operation is sensed and display the enlarged text.

Further, in the case of photographing the text image using the camera to acquire the text image, the controller 280 may store the plurality of binarized text image frames in the storage unit 250. In this case, the storage unit 250 may be implemented as a buffer in which the image frame in the preset section is stored.

Further, when the preset command is input, the controller 280 may determine the text image frame having the smallest blurring among the plurality of binarized text image frames and may control the display unit 230 to display the determined text image frame.

Figure 10A:
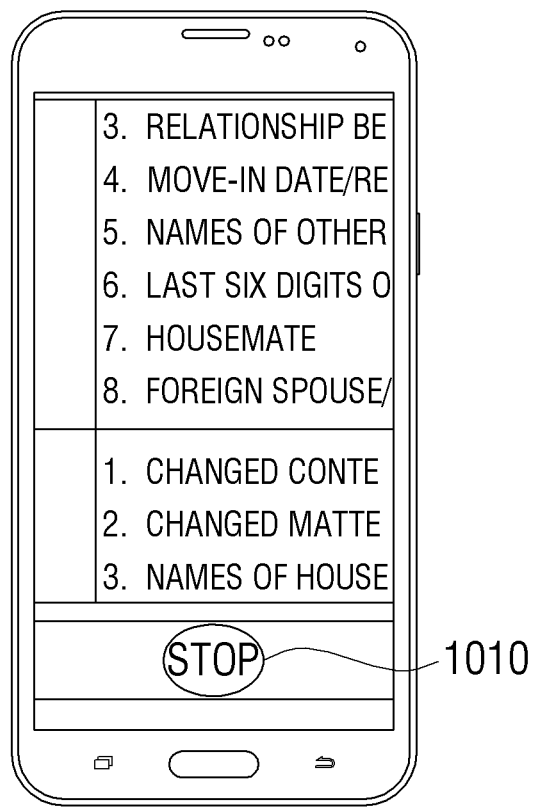

Referring to FIG. 10A, to acquire the text image having the smallest blurring while the user photographs the text image using the camera, when a stop button 1010 is selected, the controller 280 may determine the text image frame having the smallest blurring using the plurality of text image frames stored in the preset section.

According to various embodiments of the present disclosure, the controller 280 may detect the text area from the plurality of text image frames and determine the number of pixels in the detected text area. However, the controller 280 may determine the text image frame, in which the number of pixels of a specific color (for example, black) among the plurality of text image frames is smallest, as the text image frame having the smallest blurring. According to an embodiment of the present disclosure, the controller 280 may calculate the number of black pixels for a specific letter of the text area and determine the text image frame in which the number of pixels included in the specific letter is smallest as the text image frame having the smallest blurring. According to an embodiment of the present disclosure, the controller 280 may perform an optical character recognition (OCR) on the specific area or the overall area and determine the text image frame having the largest number of recognized characters as the text image frame having the smallest blurring at the time of performing the optical character recognition. The controller 280 may use at least two of the foregoing three methods to determine the text image frame having the smallest blurring.

The controller 280 may control the display unit 230 to display the text image frame having the smallest blurring. In more detail, the controller 280 may control the display unit 230 to select the text image frame 1030 of FIG. 10C having the smaller blurring as compared to text image frame 1020 of FIG. 10B and display the selected text image frame.

The controller 280 may detect the user's hand area pointing out the text in the photographed text image and perform the binarization on the remaining area other than the user's hand area. The controller 280 may synthesize the binarized remaining area with the user's hand area to generate the partially binarized text image.

In more detail, in the case of reading the text image by photographing the text document, it is difficult to figure out which portion the user reads. Therefore, to prevent the above problem, in the case of photographing the text document using the camera, it is possible to easily confirm which portion the user reads by detecting the human hand area which the user's finger points out and representing an original color of the human hand without performing the binarization on the user's hand area. According to various embodiments of the present disclosure, the human hand may be represented by the original color, which is only an example. Therefore, the controller 280 may control the display unit 230 to display by representing the human hand by other colors or changing the human hand to other objects.

The controller 280 may detect the text area having the text in the text image and perform the binarization only on the text area. The controller 280 may detect a picture area, a graph area, and a figure area in addition to the text area and generate the binarized text image only for the text area without performing the binarization on the picture area, the graph area, and the figure area while the text area is binarized. In this case, the controller 280 may represent the picture area, the graph area, and the figure area other than the text area by the original color or represent them by the preset color.

Further, when the user touch operation is sensed in one of the picture area, the graph area, and the figure area, the controller 280 may control the display unit 230 to control the size of the area in which the user touch operation is sensed and display the controlled area.

Figure 11A:
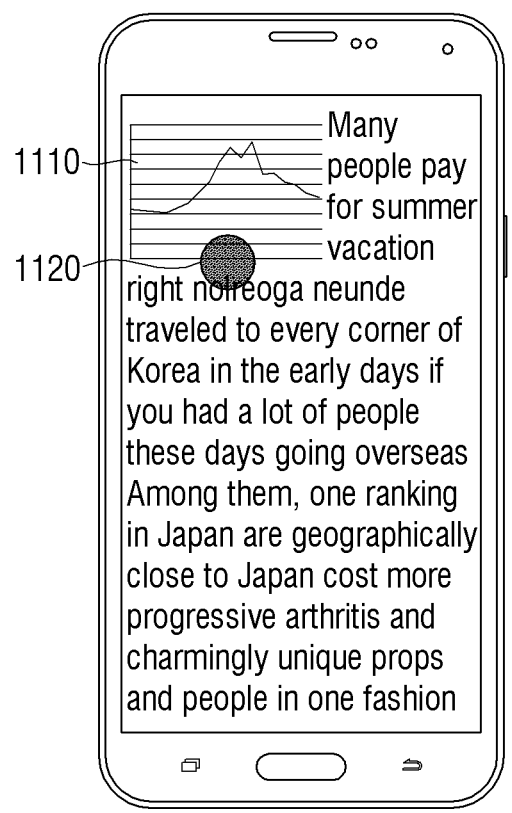
Figure 11B:
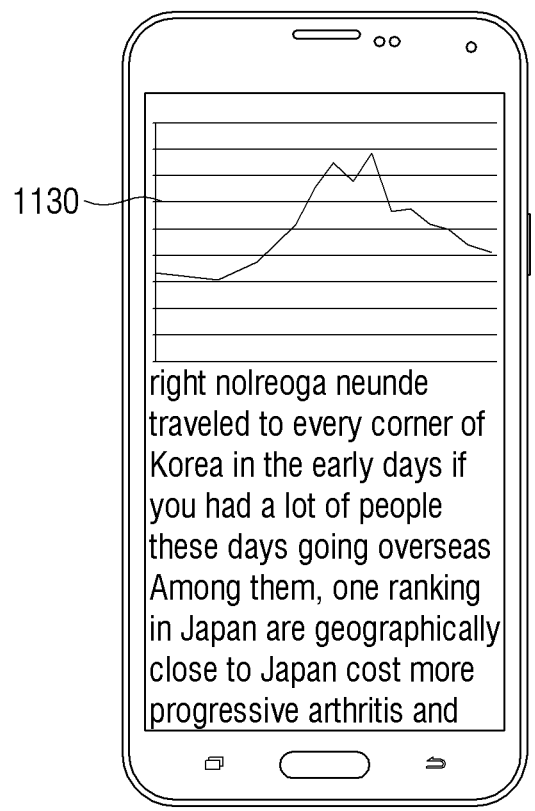

Referring to FIG. 11A, when the user touch operation touching a first point 1120 in the text image including a first graph 1110 is sensed, as illustrated in FIG. 11B, the controller 280 may control the display unit 230 to enlarge the first graph 1110 and display the first graph 1130 having the enlarged size.

As described above, according to various embodiments of the present disclosure, the user may more clearly and accurately watch the text image.

FIGS. 12 to 17 are flowcharts for describing a method for controlling a user terminal device according to various embodiments of the present disclosure.

FIG. 12 is a flowchart for describing a method for generating an indicator according to an embodiment of the present disclosure.

Referring to FIG. 12, the user terminal device 200 may acquire the text image including the text at operation S1210. In this case, the user terminal device 200 may use the camera to photograph the text document, to thereby acquire the text image and acquire the text image from an external source (for example, server).

The user terminal device 200 binarizes the text image at operation S1220. In this case, as illustrated in FIG. 3, the user terminal device 200 may use the difference image to perform the binarization on the text image.

The user terminal device 200 senses the user touch operation on the binarized text image at operation S1230.

The user terminal device 200 generates the indicator pointing out the point where the user touch operation is sensed and displays the indicator in the binarized text image at operation S1240. In this case, the user terminal device 200 may display indicators such as the human hand shape, a bar shape, and the like, at the point where the user touch operation is sensed.

As described above, the indicator is displayed at the point where the user points out, and thus the user may more easily confirm a portion which he/she is reading now.

FIG. 13 is a flowchart for describing an example in which a user terminal device binarizes an acquired text image to be controlled to a preset size, according to various embodiments of the present disclosure.

Referring to FIG. 13, the user terminal device 200 may photograph the text image including the text at operation S1310.

The user terminal device 200 binarizes the text image at operation S1320.

The user terminal device 200 estimates the direction and the size of the text included in the text image at operation S1330. In more detail, the user terminal device 200 may rotate by a reference angle and calculate a histogram of pixels corresponding to a text in a vertical direction to the reference angle. The user terminal device 200 selects a reference angle at which the histogram form alternately shows the text area and a background area. The user terminal device 200 uses the selected reference angle to determine a direction of a text sentence. The user terminal device 200 may measure a size for a portion corresponding to a character in the histogram and determine the measured size as the text size.

The user terminal device 200 controls the text to the preset size at operation S1340. In more detail, as described in S1330, the user terminal device 200 determines the size of the text and determines whether the determined size of text is smaller than the preset size. Further, if it is determined that the determined size of text is smaller than the preset size, the user terminal device 200 may enlarge the text included in the binarized text image to the preset size and if it is determined that the determined size of text is larger than the preset size, the user terminal device 200 may reduce the text included in the binarized text image to the preset size. In this case, the preset size may be defined at the time of production, which is only an example. Therefore, the preset size may be set by the user.

The user terminal device 200 may display the text image including the text of which size is controlled at operation S1350.

As described above, the size of the photographed text image is displayed while being controlled to the preset size, and thus the user terminal device 200 may provide the text having the size at which the user is convenient to watch to the user.

Figure 14:
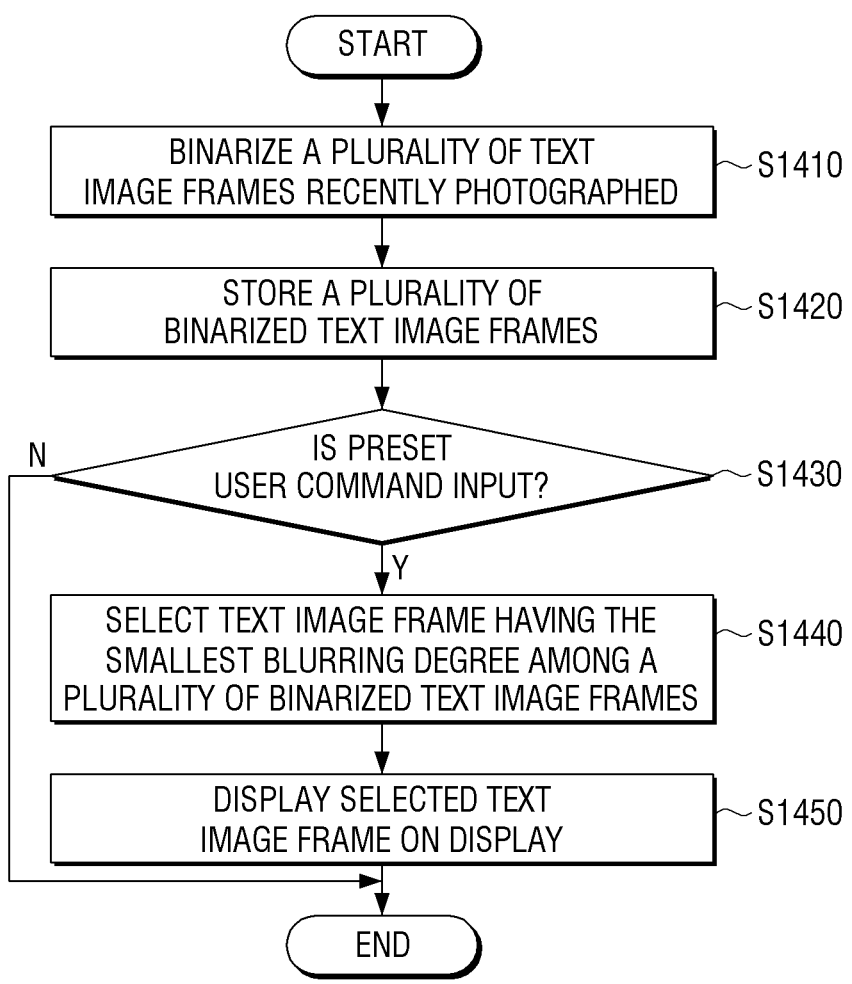

FIG. 14 is a flowchart for describing an example in which a user terminal device determines the blurring degree to provide the text image according to various embodiments of the present disclosure.

Referring to FIG. 14, the user terminal device 200 binarizes the plurality of recently photographed text image frames at operation S1410.

The user terminal device 200 stores the plurality of binarized text image frames at operation S1420.

The user terminal device 200 determines whether the preset user command is input at operation S1430. In this case, the preset user command may be a user command to select the stop button displayed on the display screen.

When the preset user command is input at operation S1430-Y, the user terminal device 200 selects the text image frame having the smallest blurring degree among the plurality of binarized text image frames at operation S1440. In this case, the user terminal device 200 may determine the text image frame, in which the number of pixels of the specific color (for example, black) among the plurality of text image frames is smallest, as the text image frame having the smallest blurring. The user terminal device 200 may calculate the number of black pixels for the specific letter of the text area and determine the text image frame in which the number of pixels included in the specific letter is smallest as the text image frame having the smallest blurring. The user terminal device 200 may perform the OCR on the specific area or the overall area and determine the text image frame having the largest number of recognized characters as the text image frame having the smallest blurring.

The user terminal device 200 displays the selected text image frame at operation S1450.

As described above, the text image frame having the smallest blurring is displayed and thus the user may receive the clear text image.

Figure 15:
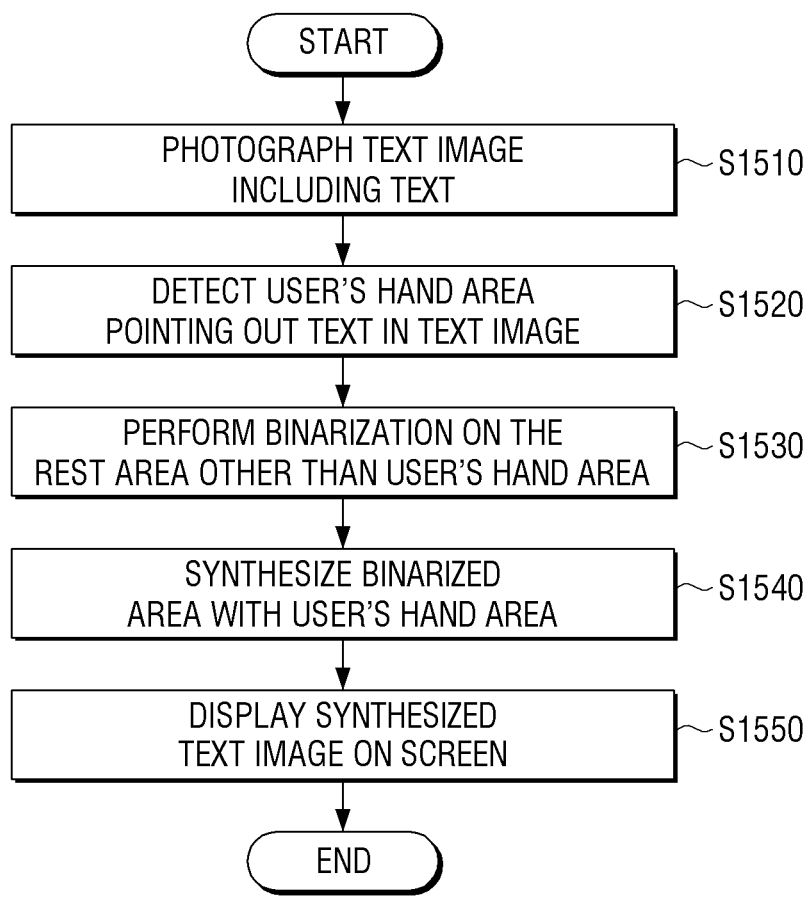

FIG. 15 is a flowchart for describing an example of partially performing, by a user terminal device, binarization according to an embodiment of the present disclosure.

Referring to FIG. 15, the user terminal device 200 may photograph the text image including the text at operation S1510.

The user terminal device 200 detects the hand area pointing out the text in the text image at operation S1520.

The user terminal device 200 performs the binarization on the remaining area other than the user's hand area at operation S1530. That is, the user terminal device 200 may perform the binarization on the text area other than the user's hand area pointing out the specific text in the photographed text image.

The user terminal device 200 synthesizes the binarized area with the user's hand area at operation S1540. In this case, the user terminal device 200 may represent the user's hand area by the photographed image graph, which is only an example. Therefore, the user's hand area may be represented by other colors or may be displayed while being replaced by other objects.

The user terminal device 200 displays the synthesized text image on the screen at operation S1550.

As described above, the portion pointed out by the user is displayed without being binarized, thereby preventing the unnecessary binarization operation and more easily confirming the portion pointed out by the user.

Figure 16:
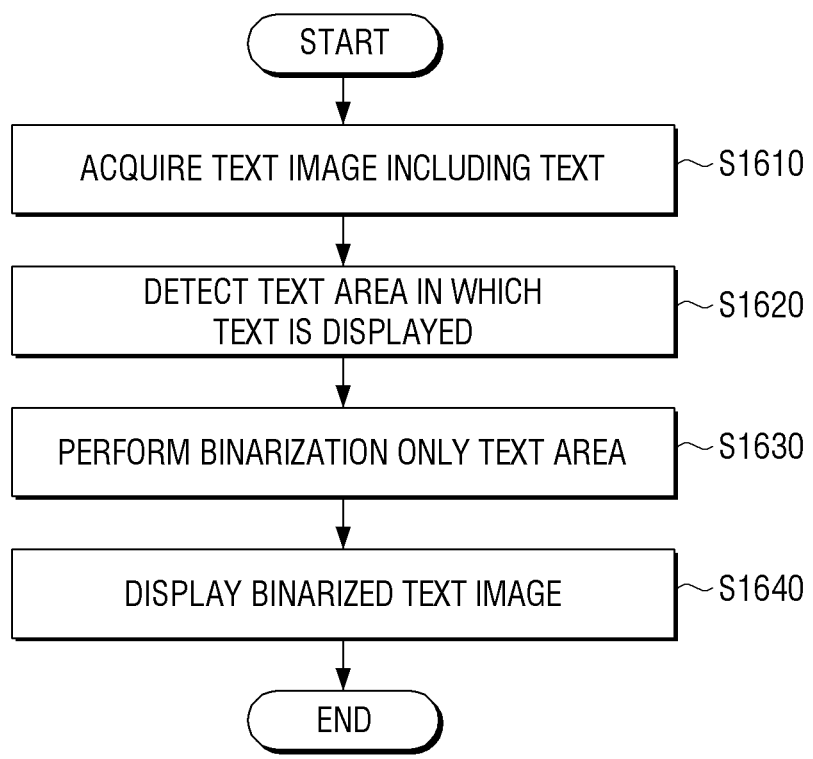

FIG. 16 is a flowchart for describing an example of performing, by a user terminal device, binarization only on text area according to an embodiment of the present disclosure.

Referring to FIG. 16, the user terminal device 200 may acquire the text image including the text at operation S1610.

The user terminal device 200 may detect the text area in which the text is displayed at operation S1620.

The user terminal device 200 may perform the binarization only on the text image at operation S1630. That is, the user terminal device 200 does not perform the binarization on other areas such as the picture area, the graph area, and a table area other than the text area.

The user terminal device 200 may display the binarized text image at operation S1640.

As described above, the binarization is performed only on the text area, and thus the user terminal device 200 prevents the unnecessary binarization operation, thereby reducing the computation.

Figure 17:
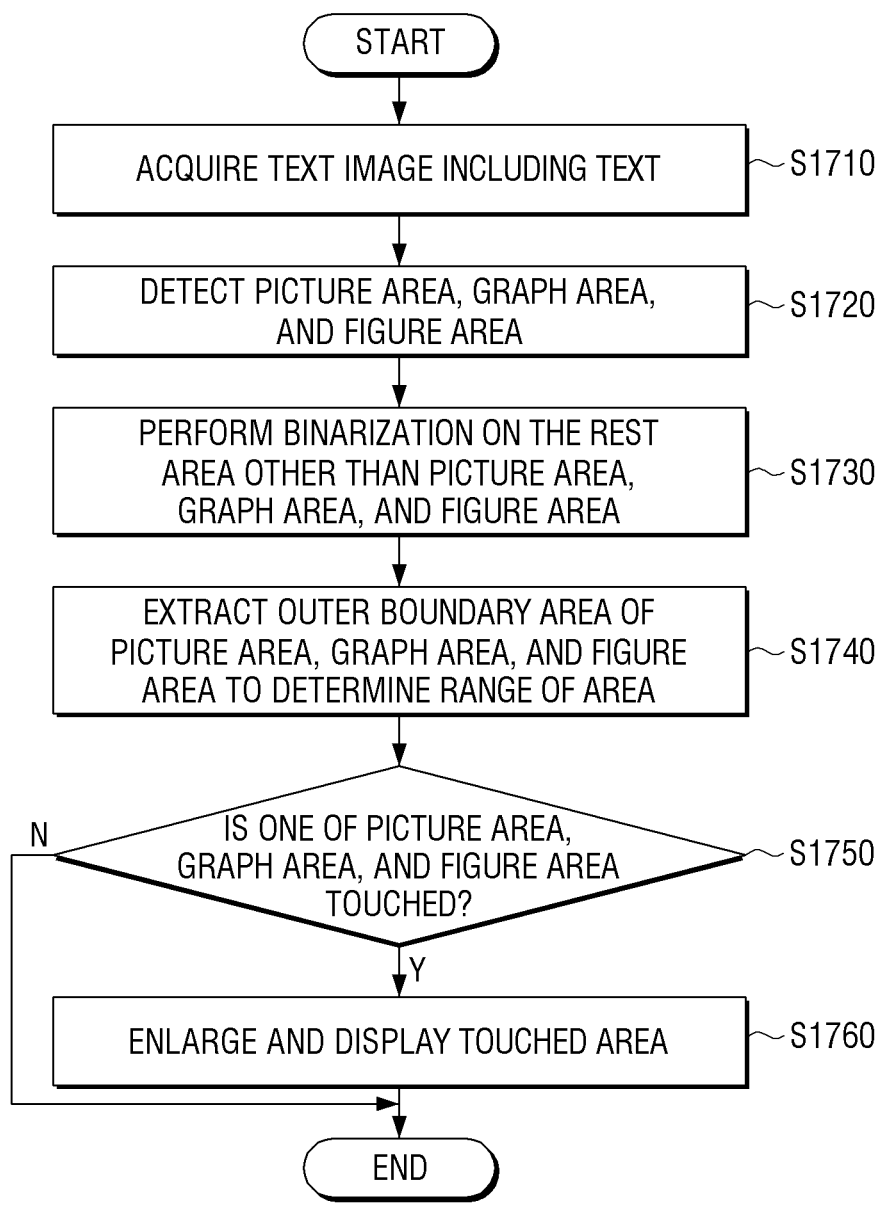

FIG. 17 is a flowchart for describing an example of enlarging and providing, by a user terminal device, a point where a user touch operation is sensed according to an embodiment of the present disclosure.

Referring to FIG. 17, the user terminal device 200 may acquire the text image including the text at operation S1710.

The user terminal device 200 may detect the picture area, the graph area, and the figure area at operation S1720.

The user terminal device 200 may perform the binarization only on the remaining area other than the picture area, the graph area, and the figure area at operation S1730. That is, the user terminal device 200 does not perform binarization on the picture area, the graph area, and the figure area.

The user terminal device 200 may extract an outer boundary area of the picture area, the graph area, and the figure area to determine the range of the extracted area at operation S1740.

The user terminal device 200 may sense the user touch operation touching one of the picture area, the graph area, and the figure area at operation S1750. That is, the user terminal device 200 may determine whether the user touch operation is made within the extracted area.

When the user touch operation is sensed at operation S1750-Y, the user terminal device 200 may enlarge and display the touched area at operation S1760.

As described above, the user may confirm in more detail the area which he/she wants to watch in addition to the text area, by enlarging and providing the point touched by the user in addition to the text area.

As described above, according to various embodiments of the present disclosure, clearer and bigger text is provided to the user at a point which is pointed out by the user along with the indicator, and thus even a person with poor vision may easily read the text included in the text image.

The device according to various embodiments of the present disclosure may include a processor, a memory storing and executing program data, a permanent storage such as a disk drive, a communication port communicating with external devices, a touch panel, a key, a user interface device such as a button, etc. Methods implemented by a software module or algorithm may be stored on a computer-readable recording medium as computer-readable codes or program commands which are executable by the processor. Here, as the computer-readable recording medium, there are a magnetic storage medium (for example, ROM, RAM, floppy disk, hard disk, etc.) and an optical reading medium (for example, compact disc ROM (CD-ROM), digital versatile disc (DVD)), etc. The computer-readable recording medium may be distributed into computer systems connected to a network and also includes a form in which the computer-readable code is stored and executed based on a distribution type. The medium may be read by a computer, stored in the memory, executed by the processor. Various embodiments of the present disclosure may be represented by functional block configurations and various processing operations. The functional blocks may be implemented by various number of hardwares or/and software configurations which execute specific functions. For example, various embodiments of the present disclosure may adopt direct circuit configurations such as memory, processing, logic, and look-up table which may execute various functions by a control of at least one microprocessor or other control devices. Like executing the components by software programming or software elements, various embodiments of the present disclosure include various algorithms which are implemented by a data structure, processes, routines, or a combination of other programming configurations, which may be implemented programming or scripting languages such as C, C++, Java, and assembler. The functional aspects may be implemented by algorithm which is executed by at least one processor. Further, various embodiments of the present disclosure may adopt the related art for electronic environmental setting, signal processing, and/or data processing, etc. The terms "mechanism", "element", "means", "configuration", etc., may be widely used and are not limited to mechanical and physical components. The terms may include a meaning of a series of routines of software in connection with the processor, etc.

Specific executions described in the various embodiments of the present disclosure are examples and therefore do not limit the technical ranges of the present disclosure. For simplification of the present disclosure, the description of the typical electronic components, control systems, software, and other functional aspects of the systems may be omitted. Further, connections or connection members of lines between components illustrated in the drawings illustrate the functional connections and/or the physical or circuited connections and in the actual device, may be replaced or may be represented as additional various functional connections, the physical connections, or the circuit connections.

The use of the term "the" and the indication term similar thereto in the present disclosure (in particular, claims) may correspond to a singular form and a plural form. Further, the description of the range includes individual values belonging to the range (unless stated specifically), which is one that each individual value configuring the range is described in the detailed description. Finally, an order for operations configuring the method is clearly described or unless stated specifically, the operations may be performed in a proper order. The present disclosure is not necessarily limited to the description order of the operations.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A user terminal device comprising:
   an image receiver configured to acquire a text image including a text which is photographed by a camera;
   a sensor configured to sense a user touch operation for a binarized text image of the acquired text image;
   a processor configured to generate an indicator pointing out a point where the user touch operation is sensed when the user touch operation is sensed by the sensor; and
   a display configured to display the binarized text image and the generated indicator at the point where the user touch operation is sensed,
   wherein the processor is further configured to:
      detect a user's hand area pointing out the text in the text image, and
      obtain the binarized text image by performing binarization on a remaining area other than the user's hand area and synthesizing the binarized remaining area with the user's hand area.

2. The user terminal device of claim 1, wherein the processor is further configured to control the display to control a size of text included in the binarized text image to a preset size and display the controlled text.

3. The user terminal device of claim 1, wherein the processor is further configured to:

sample the text image to obtain a sampled image,
calculate an average value of pixel values of the sampled image,
obtain a difference image in which the average value is subtracted from each pixel value of the sampled image,
divide the sampled image into a plurality of blocks,
use the difference image to calculate an average and a standard deviation of the plurality of blocks,
use the average and the standard deviation of the plurality of blocks to calculate a threshold of the plurality of blocks, and
use the threshold to binarize the sampled image.

4. The user terminal device of claim 1, further comprising:
a memory,
wherein the processor is further configured to:
store a plurality of binarized text image frames in the memory,
identify a text image frame having the smallest blurring among the plurality of binarized text image frames when a predetermined command is input, and
control the display to display the identified text image frame.

5. The user terminal device of claim 1, further comprising:
a camera configured to photograph a document including the text,
wherein the image receiver is further configured to acquire the text image using the camera.

6. The user terminal device of claim 1, wherein the processor is further configured to control the display to display the indicator of a user's finger shape or a bar shape at the point where the user touch operation is sensed.

7. A user terminal device comprising:
an image receiver configured to acquire a text image including a text;
a sensor configured to sense a user touch operation for a binarized text image of the acquired text image;
a processor configured to generate an indicator pointing out a point where the user touch operation is sensed when the user touch operation is sensed by the sensor; and
a display configured to display the binarized text image and the generated indicator at the point where the user touch operation is sensed,
wherein the processor is further configured to:
detect a picture area, a graph area, and a figure area other than a text area,
obtain the binarized text image in which only the text area is binarized without performing binarization on the picture area, the graph area, and the figure area while the text area is binarized, and
control the display to control a size of an area in which the user touch operation is sensed and display the controlled area when the user touch operation is sensed in one of the picture area, the graph area, and the figure area.

8. A method for controlling a user terminal device, the method comprising:
acquiring a text image including a text which is photographed by a camera;
binarizing the text image;
sensing a user touch operation for the binarized text image of the acquired text image;
generating an indicator pointing out a point where the user touch operation is sensed; and
displaying the indicator in the binarized text image,
wherein the binarizing comprises:
detecting a user's hand area pointing out the text in the text image, and
obtaining the binarized text image by performing binarization on a remaining area other than the user's hand area and synthesizing the binarized remaining area with the user's hand area.

9. The method of claim 8, wherein the displaying comprises controlling a size of the text included in the binarized text image to a predetermined size to display the text.

10. The method of claim 9, wherein the displaying comprises determining the size of the text included in the binarized text image, if it is determined that the determined size of text is smaller than the predetermined size, the text included in the binarized text image is displayed while being enlarged to the predetermined size, and if the determined size of text is larger than the predetermined size, the text included in the binarized text image is displayed while being reduced to the predetermined size.

11. The method of claim 8, wherein the binarizing includes:
sampling the text image to obtain a sampled image;
calculating an average value of pixel values of the sampled image;
obtaining a difference image in which the average value is subtracted from each pixel value of the sampled image;
dividing the sampled image into a plurality of blocks;
using the difference image to calculate an average and a standard deviation of the plurality of blocks;
using the average and the standard deviation of the plurality of blocks to calculate a threshold of the plurality of blocks; and
using the threshold to binarize the sampled image.

12. The method of claim 8, wherein the displaying includes:
when a predetermined command is input, identifying a text image frame having the smallest blurring among a plurality of binarized text image frames stored during a predetermined period; and
displaying the identified text image frame.

13. The method of claim 8, wherein the acquiring of the text image includes:
photographing a document including the text using the camera; and
acquiring the photographed text image.

14. The method of claim 8, wherein the displaying of the indicator comprises displaying the indicator of a user's finger shape or a bar shape at the point where the user touch operation is sensed.

15. A method for controlling a user terminal device, the method comprising:
acquiring a text image including a text;
binarizing the text image;
sensing a user touch operation for the binarized text image of the acquired text image;
generating an indicator pointing out a point where the user touch operation is sensed; and
displaying the indicator in the binarized text image,
wherein the binarizing comprises:
detecting a picture area, a graph area, and a figure area other than a text area,
obtaining the binarized text image only in the text area without performing binarization on the picture area, the graph area, and the figure area while the text area is binarized, and
wherein the displaying comprises:

controlling a size of an area in which the user touch operation is sensed, and displaying the controlled area when the user touch operation is sensed in one of the picture are, the graph area, and the figure area.

\* \* \* \* \*